United States Patent [19]

Taylor

[11] Patent Number: 4,967,939
[45] Date of Patent: Nov. 6, 1990

[54] SELF-STIRRING PITCHER

[76] Inventor: Christopher A. Taylor, 44 Redwood Rd., Severna Park, Md. 21146

[21] Appl. No.: 357,957

[22] Filed: May 30, 1989

[51] Int. Cl.⁵ .............................................. B67D 5/08
[52] U.S. Cl. ..................................... 222/196; 222/210; 222/424; 222/465.1; 366/136
[58] Field of Search ............... 222/196, 202, 203, 206, 222/209, 210, 196, 318, 424, 465.1, 470; 99/300, 302 FB, 302 R, 307; 366/136, 137

[56] References Cited

U.S. PATENT DOCUMENTS

| | | | |
|---|---|---|---|
| 56,991 | 8/1866 | Robbins | 222/210 |
| 69,485 | 10/1867 | Robbins | 222/210 |
| 178,096 | 5/1876 | Ballou et al. | 222/210 |
| 479,318 | 7/1892 | Thiellesen | 222/210 |
| 1,373,244 | 3/1921 | Hernandez | 222/470 |
| 3,127,068 | 3/1964 | Sutter | 222/210 |
| 3,232,495 | 2/1966 | Schneider | 222/210 |
| 3,877,614 | 4/1975 | Murphy | 222/210 |
| 4,600,130 | 7/1986 | Libit | 222/209 |
| 4,700,892 | 10/1987 | Cunning | 222/192 |

Primary Examiner—H. Grant Skaggs
Assistant Examiner—Steve Reiss
Attorney, Agent, or Firm—N. J. Aquilino

[57] ABSTRACT

A self-stirring container for a consumable liquid having an integral stirring apparatus including a hollow handle and a pump which pumps liquid from the bottom of the container up through the handle and back into the top of the container thereby mixing the liquid in a continuous manner until it becomes homogeneous.

5 Claims, 1 Drawing Sheet

SELF-STIRRING PITCHER

BACKGROUND AND SUMMARY OF THE INVENTION

The present invention relates to a container of the type used to store fruit juice and the like, and in particular to a hand-held pitcher having integral self-stirring means to enable the contents of the pitcher to be stirred without the use of an auxillary stirring implement.

It is well known to hold and store consumable liquids in containers such as a pitcher. Such liquid beverages include, but are not limited to, orange juice, grape juice, grapefruit juice, tomato juice and various other type of fruits and vegetable juices made directly from the fruit or vegetable product itself, or from concentrate or powder. When such consumable liquids are stored for long periods of time, for example in a refrigerator overnight, the bulk portion of the liquid tends to settle and collect in the bottom of the pitcher. This requires the pitcher to be stirred using a large spoon stirrer or other auxillary element, or requires that the pitcher be covered and shook in order to mix the ingredients of the consumable beverage back into a uniform solution. If proper care is not taken during the stirring or mixing, the liquid can easily be spilled, thereby creating undesireable cleanup problems. Often a stirring implement may not be readily availiable, as for example if the pitcher is used in an outdoor environment, again creating difficulty in uniformly mixing the liquid.

The present invention eliminates the need for auxillary stirring elements and mixing practices which tend to be messy and inconvenient to perform. The self-stirring pitcher includes an integral stirring device which allows a user to remix the consumable liquid with one hand without removing the top of the container. In a preferred embodiment, the mixing device is a hand actuated pump formed as a part of the handle of the pitcher. The handle is hollow and includes an opening near the bottom of the pitcher, and also a second opening near the top. A pump is attached to the handle between the top and bottom opening at a point where a user would grip the pitcher in order to pour it. The pump housing is liquid tight and communicates with the interior of the hollow handle. In use the pump is actuated to create a siphon effect and pump the consumable liquid from the bottom of the pitcher up through the handle and back into the top of the pitcher. Suitable one-way valves are provided in order to provide a one-way liquid flow path from the bottom of the pitcher to the top. For most consumable liquids stored in the pitcher, such as fruit juices and the like, a relatively small number of pump strokes will completely mix any settled material back into liquid suspension.

Among the objects of the present invention are the provision of a liquid storing pitcher having a self-stirring feature which is self contained, and eliminates the need for auxilliary stirring equipment; the provision of a self-stirring pitcher which eliminates spillage and the accompanying cleanup procedures which occur during normal mixing techniques.

DESCRIPTION OF PREFERRED EMBODIMENTS

Figure 1:
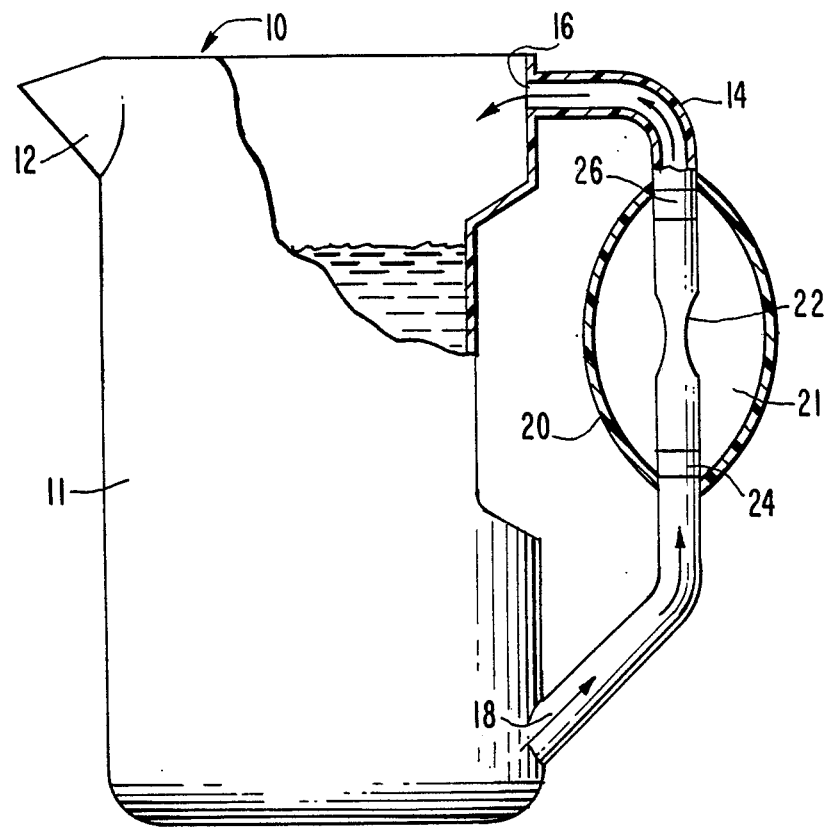
FIG. 1 is a pictorial view, partly in section, of the present invention.

Referring to the drawings FIG. 1 illustrates a preferred embodiment of a self-stirring pitcher 10 having an open top and a pour spout 12. The pitcher is designed to accommodate any type of pourable liquid, and is particularly structured to be used to store consumable liquids held in solution such as various types of fruit or vegetable juices. The pitcher 10 can be made of any suitable material such as polyvinyl chloride plastic that is readily molded to allow for the easy and inexpensive manufacture of large numbers of the devices. The pitcher 10 includes a hollow handle 14 having an upper opening 16 at the top of the pitcher 10 and a lower opening 18 at the bottom. The handle 14 is preferrably integrally molded with the pitcher body 11. The handle is provided with a flexible 20 pump positioned at the point where a user would normally grasp the handle 14 of the pitcher 10 with his or her hand. The handle 14 is provided with openings 22 which permit the consumable liquid to flow within the interior housing 21 of the pump 2 as described hereinbelow. The handle 14 is provided with a one-way valve 24 near the bottom of the pump housing 21 which permits fluid to enter into the pump 20 from the bottom of the pitcher 10 through the opening 18 in the handle. A second one-way valve 26 is provided in the handle 14 near the top of the pump housing 21 which permits the liquid to be pumped out of the pump housing 21 through the top opening 16 back into the pitcher 10. The one-way valves 24 and 26 prevent fluid from flowing back into and through the pump 20 and back into the bottom of the pitcher 10. The openings 22 in the handle are preferrably oval in shape, and are of a minimum size so as not to weaken the handle at that point. The entire pump housing 21 is made of flexible elastic material such as rubber or plastic which causes the walls of the pump housing 21 to return to the original expanded position after they are contracted by a user. The pump 20 is squeezed with one hand which creates a vacuum by expelling air out of the one-way valve 26 thereby creating a siphon effect which entrains liquid from the bottom of the pitcher 10 through the opening 18 in the handle 14 through a one-way valve 24 into the interior of the pump housing 21. Subsequent contractions of the pump will force the liquid within the pump housing 21 into the upper portion of the handle 14 through one-way valve 26 and out of the opening 16 and back into the pitcher 10. It will be appreciated that after several cycles of pump operation, settled solid particles at the bottom of the pitcher become uniformly mixed in the liquid to create a homogeneous solution.

The pitcher may be provided with a lid (not shown) for keeping the stored liquid free from contamination. With the present self-stirring pitcher 10 it is not necessary for the lid to be removed for the stirring or mixing operation to be accomplished.

Figure 2:
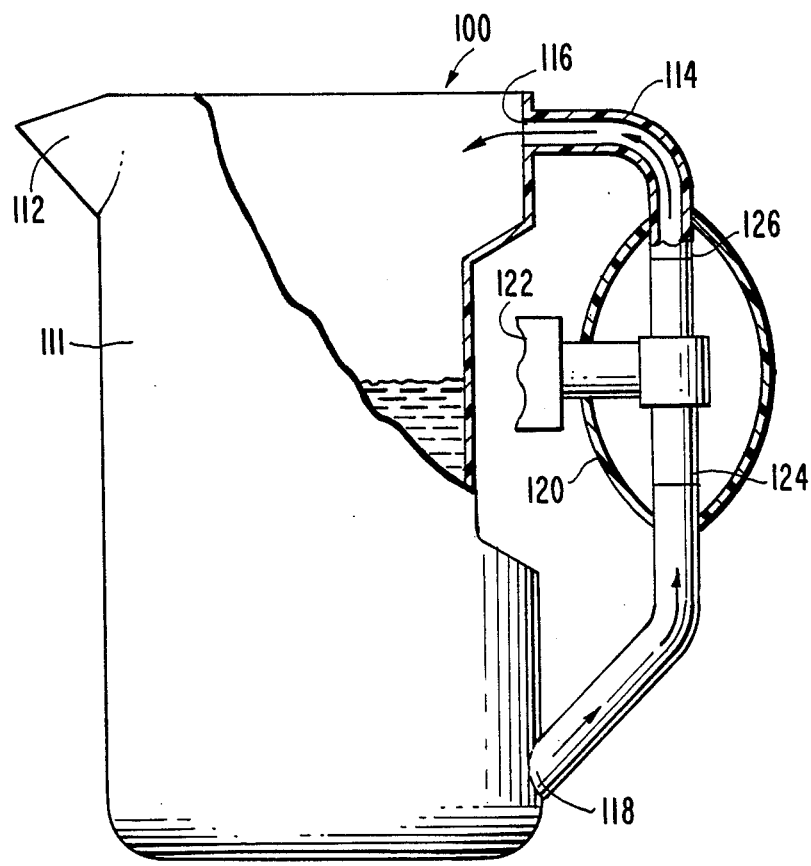
FIG. 2 is a pictorial view, partly in section, of a second embodiment of the present invention.

FIG. 2 illustrates a second embodiment of a self-stirring pitcher 100 including a pouring spout 112, and a hollow handle 114 having a top opening 116 and a bottom opening 118. In this embodiment, a pump 120 includes a finger actuated piston 122 which is actuated to draw the liquid up from the bottom of the pitcher to circulate it as described hereinabove with respect to the first embodiment. One-way valves 124 and 126 are provided for one-way circulation of the liquid.

The operation of the self-stirring pitcher 100 is essentially the same as described with respect to the first embodiment. The user grasps the handle 114 and actuates the piston 122 to entrain fluid from the bottom of the pitcher 100 through the handle 114 to the top and back into the container.

I claim:

1. A container for a consumable liquid having a liquid holding body portion and an integral stirring apparatus; said stirring apparatus including a hollow handle having a bottom opening in fluid communication with the bottom of said liquid holding body portion, and a top opening in fluid communication with the top of said liquid holding body portion; said hollow handle and said top and bottom openings forming a fluid path between said top and said bottom of said liquid holding body portion and a hand actuated pump attached to said handle for entraining said liquid into said fluid path to circulate said liquid through said handle causing said liquid to flow between said bottom and said top of said liquid holding body portion.

2. The container of claim 1 wherein said pump is a flexible bladder in liquid communication with said hollow handle whereby, in use, operation of said pump entrains liquid into and through said handle.

3. The container of claim 2 further including one-way valves causing said fluid to flow in a one-way direction in said fluid path.

4. The container of claim 1 wherein said pump is a piston and cylinder in liquid communication with said hollow handle, whereby, in use, operation of said pump entrains liquid into and through said handle.

5. The container of claim 4 further including one-way valves causing said fluid to flow in a one-way direction in said fluid path.

* * * * *